Figure 1:
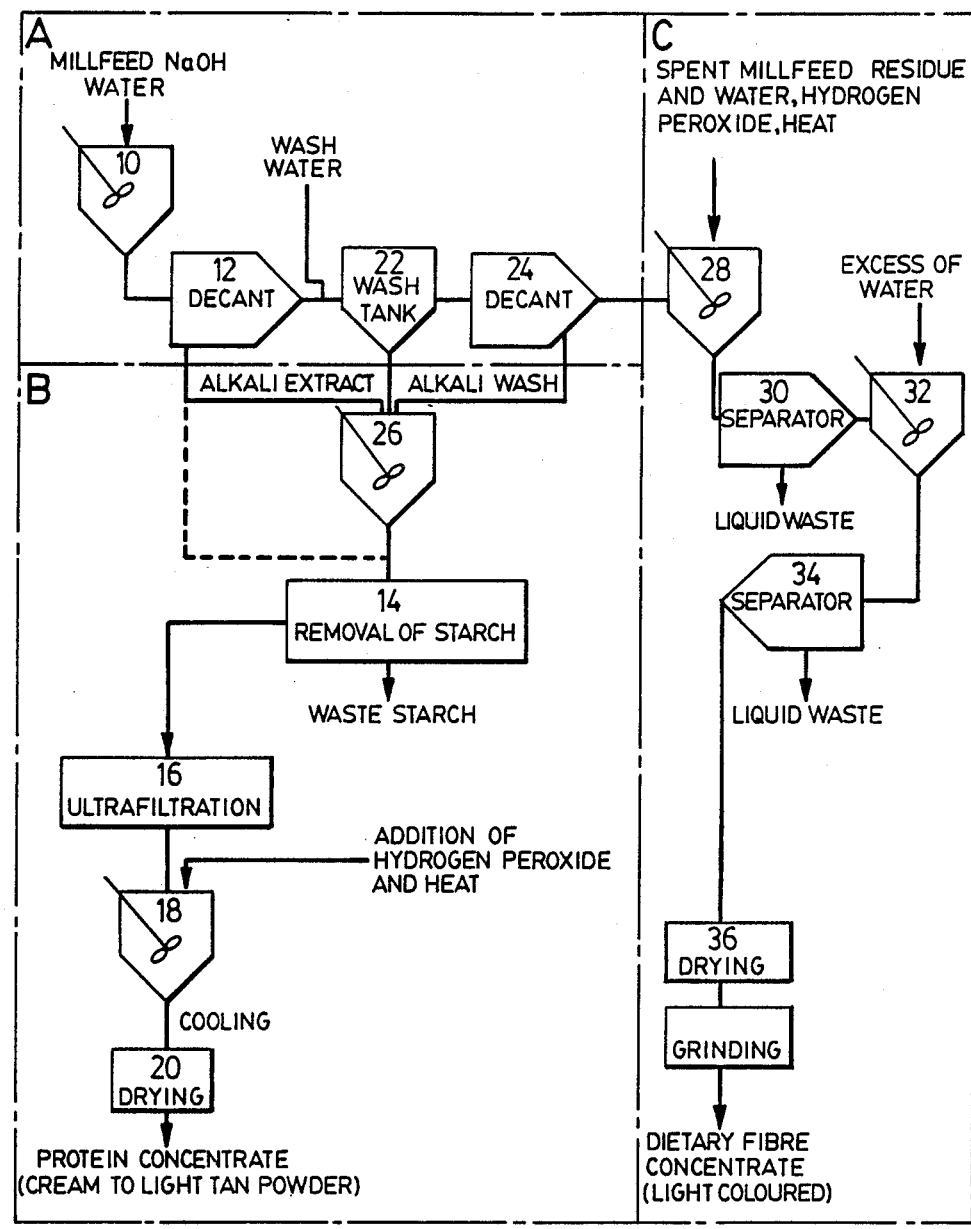

United States Patent [19]

Sadaranganey et al.

[11] Patent Number: 4,919,952

[45] Date of Patent: Apr. 24, 1990

[54] PROCESS FOR THE PRODUCTION OF LIGHT COLORED FOOD GRADE PROTEIN AND DIETARY FIBRE FROM GRAIN BY-PRODUCTS

[75] Inventors: Gobind T. Sadaranganey, Mississauga; Wendy Zellen, Weston; John Michaelides, Mannheim, all of Canada

[73] Assignee: Robin Hood Multifoods Inc., Rexdale, Canada

[21] Appl. No.: 309,903

[22] Filed: Feb. 8, 1989

Related U.S. Application Data

[63] Continuation of Ser. No. 927,363, Nov. 6, 1986, abandoned.

[30] Foreign Application Priority Data

Nov. 3, 1986 [CA] Canada .................................... 522084

[51] Int. Cl.$^5$ ...................... A21D 6/00; A23L 1/277
[52] U.S. Cl. .................... 426/254; 426/436; 426/253; 426/450; 426/452; 426/481; 426/615; 426/629; 426/640; 426/656; 530/372; 530/375; 530/414
[58] Field of Search ............... 426/253, 258, 615, 629, 426/656, 481, 254, 640, 436, 450, 452; 530/372, 375, 414

[56] References Cited

U.S. PATENT DOCUMENTS

| | | | |
|---|---|---|---|
| 3,228,771 | 1/1966 | Copley et al. | 426/258 |
| 3,574,634 | 4/1971 | Singer | 426/20 |
| 3,615,655 | 10/1971 | Freeman | 426/481 |
| 3,622,556 | 11/1971 | O'Connor | 426/656 |
| 3,859,451 | 1/1975 | Saunders et al. | 426/481 |
| 4,089,848 | 5/1978 | Bell et al. | 426/615 |
| 4,565,702 | 1/1986 | Morley et al. | 426/804 |
| 4,624,805 | 11/1986 | Lawhon | 426/656 |
| 4,645,831 | 2/1987 | Lawhon | 426/656 |
| 4,774,096 | 9/1988 | Nickel et al. | 426/253 |

Primary Examiner—Christine M. Nucker
Assistant Examiner—Timothy M. McMahon
Attorney, Agent, or Firm—Smart & Biggar

[57] ABSTRACT

Food grade protein and dietary fibre concentrates are prepared from wheat millfeed. The process utilizes an efficient alkali extraction to obtain in excess of 75% w/w of the protein present in the millfeed in a solution which is further treated to separate the suspended starch and fat. The clarified liquid containing the protein is passed over a semipermeable membrane during which it is further purified and concentrated. Hydrogen peroxide and heat are introduced to the liquid thereby reducing its color prior to spray drying. The resulting residue from the extraction is dried or further treated with hydrogen peroxide and heat to produce a light colored dietary fibre concentrate.

10 Claims, 1 Drawing Sheet

PROCESS FOR THE PRODUCTION OF LIGHT COLORED FOOD GRADE PROTEIN AND DIETARY FIBRE FROM GRAINBY-PRODUCTS

This is a continuation of Ser. No. 927,363, filed 11/6/86, now abandoned.

FIELD OF INVENTION

This invention relates to the processing of grain millfeed. In particular this invention relates to a process for preparing light coloured purified stable protein and dietary fibre concentrates from grain millfeed such as wheat millfeed. The protein and dietary fibre produced have many possible applications as ingredients in food systems.

DESCRIPTION OF PRIOR ART

During the milling of grain and in particular wheat, purified flour and germ are separated from other components of the grain kernel. These other components are referred to as millfeed, a term which includes wheat bran and shorts. Wheat millfeed is derived from the outer layers of the wheat kernel. The outermost layer is the pericarp which is comprised of the thick cell walled epidermis and hypodermis. Immediately beneath this layer, is the inner pericarp which is composed of cross cells and tube cells. To the interior of these two layers is the seed coat (testa) and the nucellar epidermis. Immediately below the nucellar tissue is situated the aleurone layer which is a layer mainly one cell thick (about 25–75 μm in thickness). When wheat is milled for flour the break takes place within the endosperm which is situated below the aleurone layer, and close to the junction of the two layers. Therefore the millfeed may contain in addition to all the layers mentioned above, some endosperm material which is high in protein. Because of the presence of these layers millfeed has superior protein, vitamin, mineral and lipid content when compared to the primary product, flour. Millfeed as a by-product constitutes an important component of the wheat milling industry. Approximately 25% of the weight of wheat milled across Canada is sold as millfeed. Literature information on the chemical composition of bran (the outer layers of the wheat kernel down to and including the aleurone cell layer) gives proximate analysis values of: moisture 3.7–17.7% w/w, protein 11.9–22.9% w/w, fat 3.0–6.8% w/w and ash 3.8–9.6% w/w. The carbohydrate component constitutes about 70% of the total dry weight of the bran. The carbohydrate portion is composed of hemicelluloses including pentosans (about 45% w/w), cellulose (about 35% w/w), starch (about 12% w/w) and free sugars (about 8% w/w). The sugars are mainly present in the aleurone layer. Seventy-five percent of these sugars are sucrose, raffinose and neokestose with stachyose, fructosylraffinose, glycerol, xylose, arabinose, glucose, fructose and low molecular weight fructosans, present at lower levels. In addition to the carbohydrates, lignin is another component of the bran which can be present in quantities up to 10% w/w of the bran. Other components include vitamins and minerals.

The digestible components of millfeed (protein, vitamins and lipids) have significant nutritive value in addition to the food value of flour, the primary product of wheat milling. In recent years it has been demonstrated that the indigestible components of millfeed are also of great value in the human diet. Four groups of compounds present in millfeed are important components of dietary fibre in terms of their function in human metabolism. These compounds are cellulose, hemicelluloses, pectins, and lignin. Each of these components plays an intricate role in human metabolic function. For example lignin has been shown to have beneficial metabolic effect through its ability to combine with bile salts which are secreted into the duodenum. Subsequently this action prevents the resorption of these salts in the large intestine. This in turn is thought to result in a lowering of blood cholesterol levels. In spite of the superior quality components of millfeed, it is generally ignored as a human food source and sold as animal feed. This is probably due to the poor palatability of millfeed.

It is known to be possible to further process millfeed into potentially higher value food products by alkali extraction of the protein from the millfeed. The practice of using alkali for dispersing plant proteins is known and has been used to produce soy protein concentrates and isolates. Alkali extraction of oats is also documented.

The first study (Fellers, D.A. et al. 1966, Solubilization of Recovery of Protein from Wheat Millfeeds. Cereal Chemistry 43:1) of the applications of wheat bran and millfeed included solubilization of the protein at alkaline pH, centrifuging to remove the non soluble matter and acid precipitating the dissolved protein. Only about 65% w/w of the total protein was dissolved and a yield of approximately only 45% w/w was obtained. The protein derived was dark in colour and it is not known how acid precipitation altered its functional properties. Several other studies have been made since but none has greatly improved upon this study. Attempts have also been made to reduce the colour of protein concentrates obtained by acid precipitation. Fellers et al. 1966 suggested the use of solvents namely ether, acetone or ethanol to decrease the colour. This resulted in a light gray product. Johnson and Anderson in U.S. Pat. No. 3,127,388 used hydrogen peroxide with heat on alkaline slurries, prior to alkaline extraction and acid precipitation of protein. This only lightened the colour to straw yellow, at the expense of decreasing the protein yield. Increased protein yields and purity have been reported for some vegetable proteins namely soybean (Okubo, K. et al. Preparation of Low Phytate Soybean Protein Isolate and Concentrate by Ultrafiltration. 1975 Cereal Chemistry 52:263) and sunflower (Maubois et al U.S. Pat. No. 3,993,636) when ultrafiltration was used as the method of protein concentration in place of acid precipitation.

The utilization, as a source of dietary fibre, of the fibrous residue remaining after the extraction of protein from millfeed has not been investigated. Indeed the main efforts so far have only been concerned with the extraction of the protein fraction from millfeed with no interest in the use of the remaining fibrous residue in human diets. Although it had been suggested as early as 1975 (Saunders et al. Cereal Chemistry 52:93) that the fibrous residue could be used as a ruminant feed, only recently (Roberts et al. J. Sci, Food Agric. 1985 36:5) has it been suggested that the protein depleted bran would be useful in the formulation of high fibre based products. Great interest has recently been generated in the use of dietary fibre in foods. Numerous investigations have shown that dietary fibre plays a very important role in human nutrition and metabolism.

SUMMARY OF INVENTION

It is an object of the present invention to provide an economical and efficient process for preparing light coloured purified stable protein concentrate from grain millfeed.

It is a further object of the present invention to provide an economical and efficient process for preparing light coloured dietary fibre concentrate from spent grain millfeed residue after extraction of the protein.

It is yet a further object of the present invention to provide an economical and efficient process for preparing light coloured dietary fibre concentrate directly from grain millfeed.

It is still a further object of the present invention to provide an economical and efficient integrated process for preparing light coloured purified stable protein and dietary fibre concentrates from grain millfeed.

These and other objects of this invention have been accomplished by the processes hereinafter summarized and described in detail.

The integrated process comprises the treatment of millfeed with alkali solution and the separation into two process streams with the final product from one stream being bleached protein concentrate and bleached dietary fibre concentrate from the other.

Protein extraction is accomplished by utilizing millfeed having reduced particle size, an appropriate extraction pH range, recovery of the solubilized protein by ultrafiltration and decolourization of the protein concentrate with hydrogen peroxide. These conditions result in a marked increase in solubilization of the protein (in excess of 75% w/w) and recovery (in excess of 55% w/w of the protein in the millfeed) in the form of light coloured, palatable food grade protein concentrate containing approximately 70% w/w protein.

As a separate stream the fibrous residue is treated to produce a light coloured product containing in excess of 85% w/w dietary fibre that can be used as an ingredient in food products.

In particular the present invention provides a process for preparing bleached purified stable protein concentrate from grain millfeed, comprising the steps of: combining grain millfeed of reduced particle size (less than 1680 μm) with an alkali solution to produce a slurry with solvent/millfeed ratio in the range of 7:1 to 10:1 v/w and having pH in the range of pH 9–11; separating the alkali liquid from the millfeed residue to isolate alkali extract; removing starch and fat from the alkali extract; ultrafiltration of the alkali extract to form a retentate using a semi-permeable membrane; bleaching the retentate by adding hydrogen peroxide and heating; cooling and drying the retentate to provide a light coloured protein concentrate.

The invention further provides a process for preparing bleached dietary fibre concentrate from spent grain millfeed residue from which protein has been extracted comprising the steps of: adding water and 35–70% w/v hydrogen peroxide to said millfeed residue to produce a slurry; heating said slurry to a temperature of 50°–100° C.; decanting the liquid and drying the residue to produce a light coloured dietary fibre concentrate.

The invention still further provides an integrated process for preparing bleached purified stable protein and dietary fibre concentrates from grain millfeed comprising the steps of: mixing grain millfeed of reduced particle size with an alkali solution to produce a slurry with solvent/millfeed ratio in range of 7:1 to 10:1 v/w and having pH in the range of pH 9–11; separating the alkali liquid from the millfeed residue to isolate alkali extract; removing starch and fat from the alkali extract; ultrafiltration of the alkali extract to form a retentate using a semi-permeable membrane; bleaching the retentate by adding hydrogen peroxide and heating; cooling and drying the retentate to provide a protein concentrate; adding water and 35–70% w/v hydrogen peroxide to said millfeed residue to produce a slurry; heating said slurry to a temperature of 50–100° C.; decanting the liquid and drying the residue to produce a light coloured dietary fibre concentrate.

The invention still further provides a process for preparing bleached dietary fibre concentrate from grain millfeed comprising the steps of: mixing grain millfeed of reduced particle size with an alkali solution to produce a slurry with solvent/millfeed ratio in the range of 7:1 to 10:1 v/w having pH in the range of pH 9–11; separating the alkali liquid from the millfeed residue to isolate alkali extract; adding water and 35–70% w/v hydrogen peroxide to said millfeed residue to produce a slurry; heating said slurry to a temperature of 50°–100° C.; decanting the liquid and drying the residue to produce a dietary fibre concentrate.

The invention still further provides for light coloured purified stable protein and dietary fibre concentrates produced by the aforesaid processes.

DESCRIPTION OF INVENTION

The following is a description by way of example of certain embodiments of the present invention, reference being had to the accompanying diagram in which:

FIG. 1 is a flow diagram of the total integrated process.

Referring to FIG. 1 the total integrated process is represented by the processes set out in boxes A, B and C.

A combination of shorts together with finely ground fine and coarse wheat bran in proportions produced under normal milling conditions is used. Millfeed from grain other than wheat may also be used as raw materials for the process. The raw materials are passed through a grinding roll and screened so that the particles used for the extraction are less than 1680 μm (micrometers) in size. The reduced particle size provides for higher extractions. Coarser particles provide lower yield. Still finer particles would give better yields but are difficult to obtain economically. As shown in FIG. 1 the millfeed is then combined (10) with alkali to obtain a pH in the range pH 9 to 11. A pH outside of this range diminishes extraction. Sodium hydroxide is the preferred alkali but ammonium or potassium hydroxide or other alkali may also be used. It is preferred that the alkali is dissolved in water prior to the addition of the millfeed. The desired ratio of solvent to millfeed is in the range of 7:1 to 10:1 v/w. Agitation of the resulting slurry is continued for about 45 to 90 minutes with the temperature maintained between 20° to 25° C. The pH is monitored throughout the process and additional alkali is added if the pH falls below the range pH 9–11. After the 45 to 90 minute contact time between the millfeed and the alkali solution, the spent millfeed is separated (12) from the liquid extract by known mechanical means such as a decanter centrifuge, filter press or screwpress. The residue is washed with water and the alkali wash of residue along with the liquid extract is subjected to centrifugation (14) or other process to remove the starch and fat. The starch-free or clarified protein liquid is subjected to ultrafiltration (16) by passing it over a semipermeable membrane having a nominal molecular weight cut-off in the range of 5,000 to 25,000 and preferably between 8,000 to 15,000, at a temperature in the range of 10° C. to 35° C. The pressure of the liquid entering the ultrafiltration module is between 40 to 60 psi and that leaving the module between 20 and 40 psi. Ultrafiltration is continued until the nitrogenous matter content of the retantate is 70% w/w (N X 6.25) or greater of the total dry matter of the retantate. The resultant purified and concentrated protein liquid is decolourized or bleached (18) by the addition of hydrogen peroxide at a level of 1 to 4% w/v, and by heating the mixture to between 50° and 65° C. and maintaining it at that temperature for between 120 and 180 minutes. After cooling to 2° C. the mixture is held for a period of up to 24 hours. At this time, the pH of the protein liquid is adjusted to a pH of 6.5 to 7.0 with a food grade organic acid. The pH adjusted protein liquid is then dried (20) by spraying or other means to give a cream to light tan powder protein concentrate containing 5-8% w/w moisture. This process stream is represented by boxes A and B of FIG. 1.

In a second process stream, represented in boxes A and C of FIG. 1, the residue remaining after separation (12) from the liquid alkali extract is washed (22) with water and subjected to centrifugation (24) to produce an alkali wash. The alkali wash is added (26) to the alkali extract in the process stream leading to the protein concentrate (Box B). Returning to the second process stream, the wet spent grain millfeed residue (that from which protein has been extracted) is decolourized or bleached (28) by adding water and 35% to 50% w/w hydrogen peroxide to form a slurry which contains 10-15% w/v residue solids and 1 to 14% w/v hydrogen peroxide. The slurry is heated to 50-100° C. and held for 30 to 40 minutes. The liquid is then decanted (30) and the bleached residue is washed (32) with an excess of water and decanted (34) again. The collected bleached product is then dried (36) at temperatures of 40-80° C. to moisture levels of 8 to 12% w/w, to produce a light coloured dietary fibre concentrate.

It will be readily apparent to those skilled in the art that various components of the integrated process (Boxes A, B and C) may be independantly utilized. Three component processes of the integrated process are represented by boxes C, A plus B and A plus C.

EXAMPLE 1

Laboratory Scale Production of Light Coloured Wheat and Dietary Fibre Concentrates from Millfeed A 2 kg sample of wheat millfeed analyzed as having 15.58% w/w protein and 12.29% w/w moisture was slurried in 14 kg of water in which 30 g of sodium hydroxide had been dissolved. This was agitated for 60 minutes at 23° C. The insoluble residue was separated from the soluble protein/starch liquid. To remove any residual protein/starch liquid from the insoluble residue, 7 kg of water was added to the residue and it was stirred for 30 minutes. The soluble portion was again separated as before. The above process gave 3779 g of insoluble residue with a protein content of 1.90% w/w. The remainder of the initial millfeed protein was found in the protein/starch liquid and represented 77.0% w/w of the original millfeed protein. To further purify the soluble components of the millfeed, the liquid was centrifuged to remove the starch. This resulted in 18,863 g of protein liquid with a protein content of 1.25% w/v giving a recovery of 75.67% w/w of the original millfeed protein. Further purification of the protein was obtained through ultrafiltration which gave 3116 g of concentrated protein containing 6.3% w/v protein. From the above data, the laboratory process as stated recovered 63% w/w of the original protein in the millfeed. The colour of the protein concentrate was lightened to a cream colour by the addition of 97 ml of 50% w/v $H_2O_2$ and heat. After a temperature of 65° C. was reached, the liquid was held at this temperature for a period of 3 hours. During this holding period it was agitated periodically. The lightened liquid was cooled rapidly and held at 2° C. overnight prior to pH adjustment down to 6.8 with an organic acid.

The second stage of the process resulted in the production of a residue which was high in dietary fibre (87% w/w, dry basis) and light in colour. To the 3779 g of wet residue, 624 ml of 50% w/v $H_2O_2$ and 6991 g of $H_2O$ was added. This was heated to a temperature of 100° C. and held for 1 hour with continuous agitation. When the reaction was complete, the bleached insoluble residue high in dietary fibre was separated from the liquid portion and washed thoroughly with an excess of water and separated again. The dietary fibre concentrate was dried in a convection oven at a temperature of 60° C. to a moisture content of 8% w/w.

EXAMPLE 2

Batch Pilot Scale Production of Light Coloured Wheat Protein and Dietary Fibre Concentrates from Millfeed Wheat millfeed having a protein content of 16.32% w/w and a moisture content of 12.89% w/w was employed. A 150 kg quantity of the millfeed was slurried in 1050 kg of water to which 2.25 kg of sodium hydroxide pellets had been added and brought into solution. The slurry was agitated for one hour at 21° C. After the extraction period, the slurry was centrifuged to remove the protein liquid and the starch from the insoluble residue. The insoluble residue was agitated with 500 kg of water and centrifuged as before. The wash from the insoluble residue was added to the protein/starch liquid from the first separation and the remaining insoluble material was decolourized as described in the second stage of process. A further centrifugation step of the protein/starch liquid resulted in a "starch-free" protein liquid. The protein liquid had a total weight of 1360 kg and contained 2.74% w/v total solids and 1.30% w/v protein. From the above data, the process example as stated provided 72.2% w/w of the protein as an extract from the original wheat millfeed. This was subjected to ultrafiltration to further purify and concentrate the protein. The result was 230 kg of concentrated protein liquid which was 6.0% w/v protein giving a 56% w/w recovery of the protein in the initial wheat millfeed. To this protein liquid, 17.7 kg of 35% w/v hydrogen peroxide was added and heated to 65° C. with continuous agitation for 3 hours, cooled to 2° C. and held overnight. The pH was lowered with an organic acid to 6.8 and spray dried to yield a protein concentrate which was cream to light tan in colour. For the second stage of the process, to the 325 kg of insoluble wet residue at 70.98% w/w moisture level, 103.8 kg of 35% w/v $H_2O_2$ and 388.19 kg of $H_2O$ were added. The mixture which contained 94.31 kg wet residue solids and 36.33 kg of $H_2O_2$ (4.45% W/V $H_2O_2$) was heated to 100° C. and held at this temperature for 60 minutes. The pH of the reactions mixture was 6.3-6.7. The liquid was decanted and the bleached residue was washed with an excess of water and decanted again. The collected bleached product was then dried in a convection oven at temperatures of 45-50° C. to a moisture level of approximately 10% w/w.

We claim:

1. An integrated process for preparing food grade bleached purified stable protein and dietary fibre concentrates from wheat millfeed comprising the steps of:
    (a) mixing wheat millfeed of particle size less than 1680 μm with an alkali solution to produce a slurry with solvent/millfeed ratio in the range of 7:1 to 10:1 v/w and having pH in the range of pH 9-11;
    (b) separating the slurry to remove the alkali liquid to isolate alkali extract and form a millfeed residue;
    (c) removing starch and fat from the alkali extract;
    (d) ultrafiltration of the alkali extract to form a retantate using a semi-permeable membrane;
    (e) bleaching the retantate by adding hydrogen peroxide and heating;
    (f) cooling and drying the bleached retantate to provide a protein concentrate;
    (g) adding water and 35-70% w/v hydrogen peroxide to said millfeed residue to produce a slurry;
    (h) heating said slurry containing millfeed residue to a temperature of 50°-100° C.; and
    (i) decanting liquid from the slurry and drying the residue to produce a dietary fibre concentrate.

2. The process of claim 1 wherein said retantate is bleached at temperatures of 50°-60° C. and held for 120-180 minutes.

3. The process of claim 1 wherein said alkali slurry of solvent and millfeed is agitated for 45-90 minutes at a temperature of 20°-25° C. and wherein said retantate is bleached by adding 1 to 4% w/v hydrogen peroxide at temperatures of 50°-60° C. and held for 120-180 minutes.

4. The process of claim 1 wherein said hydrogen peroxide added to said millfeed residue is 35-50% w/v in concentration and said slurry produced contains 10-15% w/v residue solids and 1-14% w/v hydrogen peroxide.

5. The process of claim 1 wherein said semi-permeable membrane has a nominal molecular weight cut-off range of 5,000-25,000, the pressure of alkali extract entering said semi-permeable membrane is between 40-60 psi., and said ultrafiltration is continued until the protein matter content of the retantate is at least 70% w/w of the total dry matter of the retantate.

6. The process of claim 1 wherein said alkali solution is comprised of sodium hydroxide and water, with the sodium hydroxide added to the water prior to the introduction of said wheat grain millfeed.

7. The process of claim 1 wherein the food grade bleached purified stable protein concentrate contains approximately 70% protein and the food grade bleached purified dietary fibre contains in excess of 85% dietary fibre.

8. A process for preparing food grade bleached dietary fibre concentrate from wheat millfeed comprising the steps of:
    (a) mixing wheat grain millfeed of particle size less than 1680 μm with a sodium hydroxide solution to produce a slurry with solvent/millfeed ratio in the range of 7:1 to 10:1 v/w having pH in the range of pH 9-11;
    (b) separating the alkali liquid from the slurry to isolate alkali extract and form a millfeed residue;
    (c) adding water and 35-70% w/v hydrogen peroxide 1-14% to said millfeed residue to produce a slurry;
    (d) heating said slurry to a temperature of 80°-100° C.;
    (e) decanting the liquid and drying the residue to produce a dietary fibre concentrate.

9. The process of claim 8 wherein said hydrogen peroxide and millfeed residue slurry produced contains 10-15% w/v residue solids and is heated at said temperature for 30 to 60 minutes.

10. The process of claim 8 wherein the food grade bleached dietary fibre concentrate contains in excess of 85% dietary fibre.

* * * * *